(12) United States Patent
Hao

(10) Patent No.: US 6,920,670 B2
(45) Date of Patent: Jul. 26, 2005

(54) HINGE STRUCTURE

(76) Inventor: Tai Wen Hao, No. 12, Lane 195, Hugg Hong Rd., Hsinchuang City (TW)

( * ) Notice: Subject to any disclaimer, the term of this patent is extended or adjusted under 35 U.S.C. 154(b) by 5 days.

(21) Appl. No.: 10/735,655

(22) Filed: Dec. 16, 2003

(65) Prior Publication Data

US 2005/0125951 A1 Jun. 16, 2005

(51) Int. Cl.[7] .............................................. E05D 11/08
(52) U.S. Cl. .............................. 16/340; 16/342; 16/337
(58) Field of Search .......................... 16/340, 342, 337, 16/339, 338; 361/681, 680; 403/111, 119, 120

(56) References Cited

U.S. PATENT DOCUMENTS

| | | | | |
|---|---|---|---|---|
| 5,854,735 A | * | 12/1998 | Cheng | 361/681 |
| 5,913,351 A | * | 6/1999 | Miura | 16/340 |
| 6,038,739 A | * | 3/2000 | Katoh | 16/342 |
| 6,154,925 A | * | 12/2000 | Miura | 16/338 |
| 6,253,419 B1 | * | 7/2001 | Lu | 16/340 |
| 6,530,123 B1 | * | 3/2003 | Wahlstedt | 16/342 |
| 6,539,582 B1 | * | 4/2003 | Chae | 16/340 |
| 6,618,903 B2 | * | 9/2003 | Kim | 16/337 |
| 6,665,907 B1 | * | 12/2003 | Lu | 16/340 |

* cited by examiner

Primary Examiner—Suzanne Dino Barrett
Assistant Examiner—Mark Williams
(74) Attorney, Agent, or Firm—Troxell Law Office, PLLC

(57) ABSTRACT

A hinge structure includes a pivot shaft, a bracket, a fastening member, and at least one external tooth washer located between the bracket and the fastening member. The bracket and the external tooth washer are sequentially mounted on the pivot shaft and the fastening member is screwed to a tightening section at an end of the pivot shaft. The pivot shaft and a mounting arm of the bracket are respectively connected to a mainframe and a screen of a clam-type electronic apparatus, such as a notebook computer. The external teeth of the external tooth washer are firmly and elastically compressed between the bracket and the fastening member, preventing the fastening member from turning along with the screen when the latter is pivotally turned relative to the mainframe, or separating from the pivot shaft after the screen has been pivotally turned many times.

2 Claims, 8 Drawing Sheets

HINGE STRUCTURE

FIELD OF THE INVENTION

The present invention relates to a hinge structure, and more particularly to a hinge structure suitable for mounting between a screen and a mainframe of a clam-type electronic apparatus, such as a notebook computer.

BACKGROUND OF THE INVENTION

A general portable computer, such as a notebook computer, typically includes a pair of hinges to connect a liquid crystal display (LCD) screen and a mainframe of the computer, so that the LCD screen may be pivotally turned relative to the mainframe between a lifted and a closed position. In view that the notebook computer has been widely developed and its price tends to become lower and lower to satisfy consumers, it is necessary to develop a structurally simple and stable new hinge structure for use with the notebook computer, so as to reduce the failure rate and manufacturing cost of the notebook computer.

SUMMARY OF THE INVENTION

A primary object of the present invention is to provide a hinge structure for pivotally connecting two parts of a clam-type electronic apparatus, such as the screen and the mainframe of a notebook computer, so that the clam-type electronic apparatus has lowered manufacturing cost and reduced failure rate in operation.

The hinge structure for a clam-type electronic apparatus, such as a notebook computer, according to the present invention mainly includes a pivot shaft, a bracket, a fastening member, and at least one external tooth washer located between the bracket and the fastening member.

The bracket and the external tooth washer are sequentially mounted on the pivot shaft and the fastening member is screwed to a tightening section at an end of the pivot shaft. The pivot shaft and a mounting arm of the bracket are respectively connected to a mainframe and a screen of a clam-type electronic apparatus, such as the notebook computer. External teeth of the external tooth washer are firmly and elastically pressed between the bracket and the fastening member, preventing the fastening member from turning along with the screen when the latter is pivotally turned relative to the mainframe, or separating from the pivot shaft after the screen has been pivotally turned many times.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
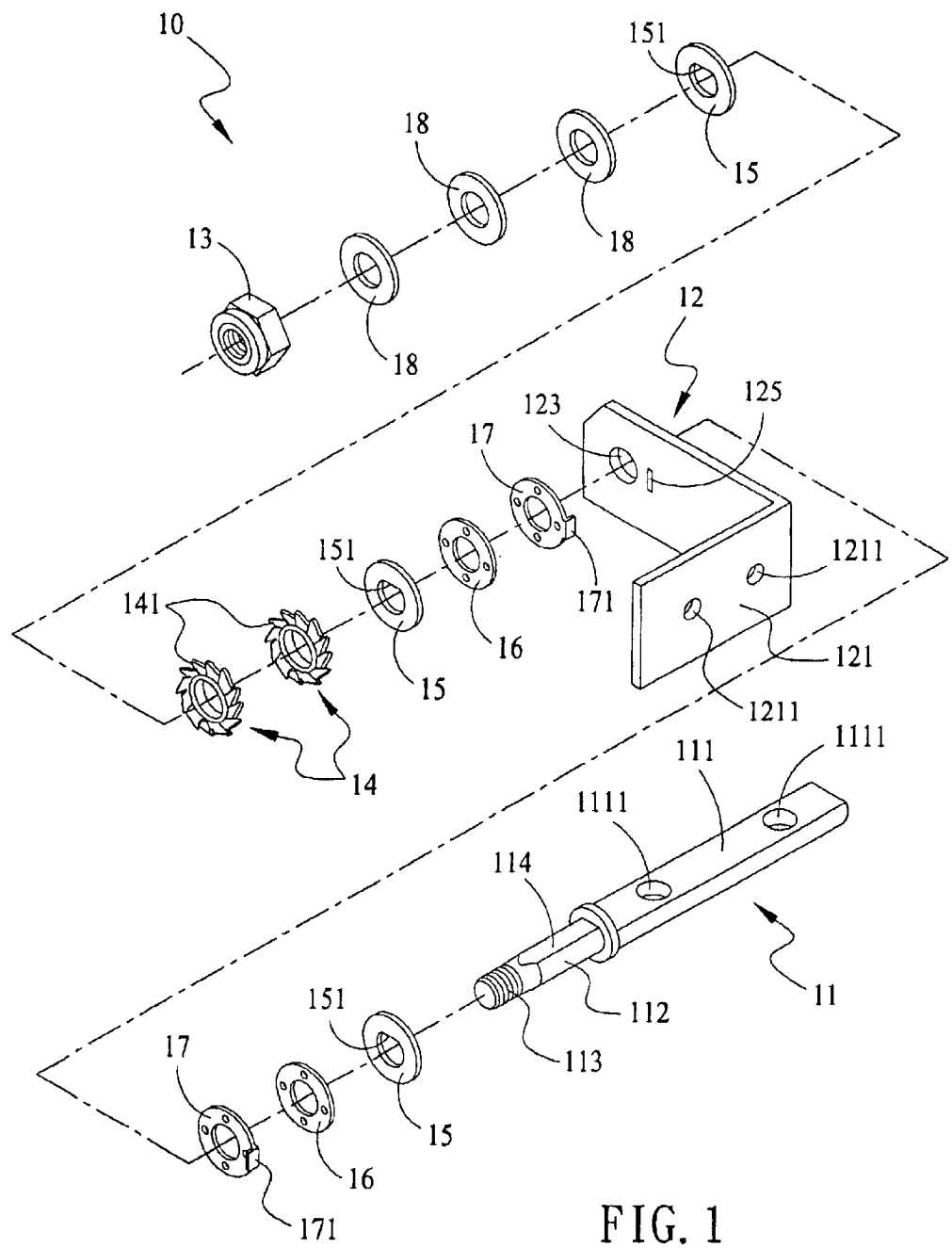
FIG. 1 is an exploded perspective view of a hinge structure according to a first embodiment of the present invention.
Figure 2:
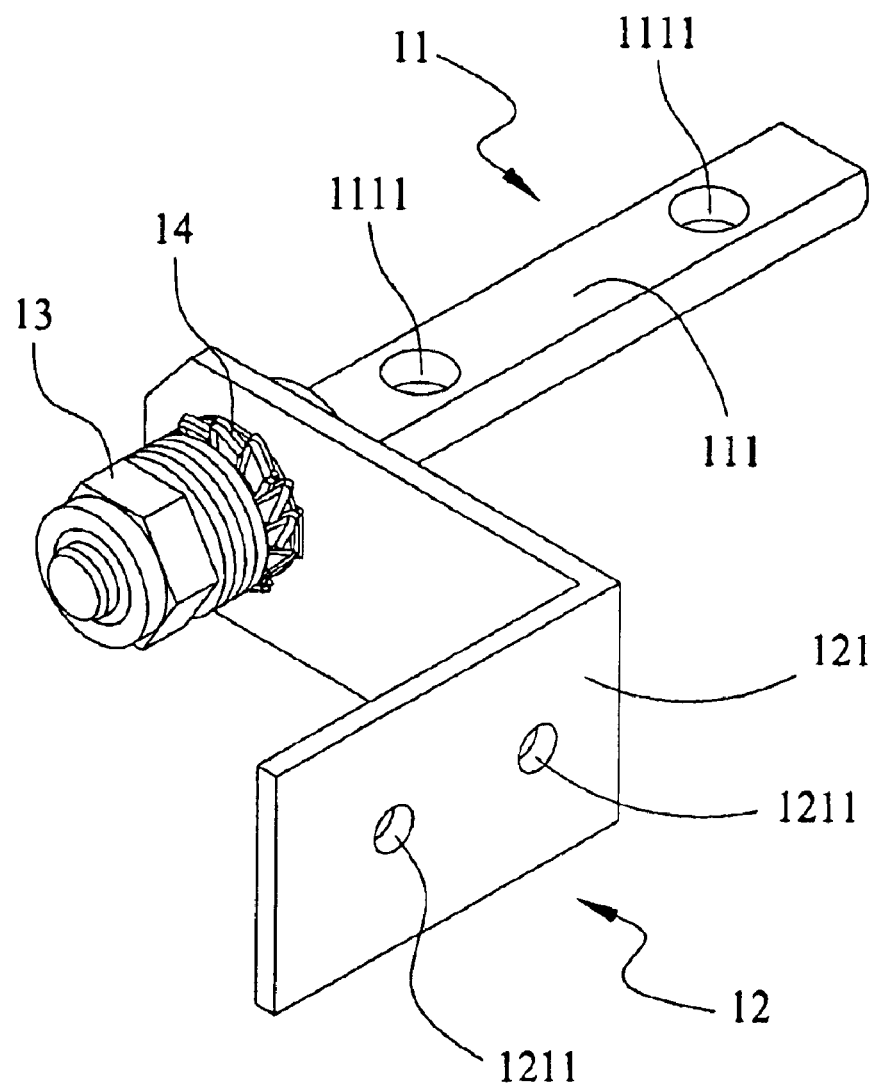
FIG. 2 is an assembled perspective view of FIG. 1.

Please refer to FIGS. 1 and 2 that are exploded and assembled perspective views, respectively, of a hinge structure 10 according to a first embodiment of the present invention for mounting between two opposite parts of a clam-type electronic apparatus, such as between a screen and a mainframe of a notebook computer (not shown), so that the two parts of the clam-type electronic apparatus may be pivotally turned about the hinge structure relative to each other. As shown in FIGS. 1 and 2, the hinge structure 10 mainly includes a pivot shaft 11, a bracket 12, a fastening member 13, and at least one external tooth washer 14 located between the bracket 12 and the fastening member 13.

The pivot shaft 11 is provided at a first end with a mounting section 111 for connecting to a first part of the clam-type electronic apparatus, such as a mainframe of a notebook computer (not shown), and at a second end with a shaft section 112 having a tightening section 113 provided at a free end thereof.

The bracket 12 is an L-shaped member having a first arm serving as a mounting arm 121 for connecting to a second part of the clam-type electronic apparatus, such as a screen of a notebook (not shown), and a second arm normal to the first arm. The second arm of the bracket 12 is provided at a predetermined position with a shaft hole 123 for rotatably engaging with the shaft section 112 of the pivot shaft 11.

The at least one external tooth washer 14 is provided along an outer circumference with a plurality of radially outward projected external teeth 141. After the bracket 12 and the at least one external tooth washer 14 are sequentially mounted on the pivot shaft 11 and the fastening member 13 is screwed to the tightening section 113 at the second end of the pivot shaft 11, the hinge structure 10 is primarily formed. When the mounting section 111 of the pivot shaft 11 and the mounting arm 121 of the bracket 12 are separately connected to the two parts of the clam-type electronic apparatus, such as the mainframe and the screen of the notebook, the external teeth 141 of the at least one external tooth washer 14 would be firmly and elastically pressed by the fastening member 13 against the bracket 12. In this manner, turning of the screen would not bring the fastening member 13 to turn at the same time, and the fastening member 13 is therefore prevented from separating from the pivot shaft 11 after the screen has been pivotally turned many times.

In the first embodiment shown in FIGS. 1 and 2, there are still a locating ring 15, an oil ring 16, and a lugged ring 17 provided between the pivot shaft 11 and the second arm of the bracket 12. Moreover, a lugged ring 17, an oil ring 16, and a locating ring 15 are also provided between the second arm of the bracket 12 and the at least one external tooth washer 14. Each of the lugged rings 17 is provided on a circumference thereof with a lug 171 that is axially extended toward one side to be perpendicular to the ring 17. And, the bracket 12 is formed on the second arm to an inner side of the shaft hole 123 with a receiving hole 125 corresponding to the lug 171 on the lugged ring 17. The two lugged rings 17 are separately located at two opposite sides of the shaft hole 123 on the second arm of the bracket 12 with the lugs 171 extended into the receiving hole 125 from two opposite sides thereof.

In the embodiment shown in FIGS. 1 and 2, there are still a locating ring 15 and at least one flat washer 18 located between the at least one external tooth washer 14 and the fastening member 13. The shaft section 112 of the pivot shaft 11 is provided at one side with a flat surface that serves as a swing-stop section 114. The locating rings 15 are provided at an inner circumference with a straight section 151 corresponding to the flat surface of the swing-stop section 114. With the straight section 151 engaged with the flat surface of the swing-stop section 114, the locating ring 15 is fixedly located on the shaft section 112.

The external teeth 141 on the at least one external tooth washer 14 are provided with a certain degree of elasticity, so that the external tooth washer 14 may bear a relatively large compressive force, and applies an axial elastic compression to other elements that are put on the shaft section 112 of the pivot shaft 11, causing these elements to elastically and tightly bear against one another. The elastic force applied by the external tooth washer 14 to other elements may be regulated via an extent by which the fastening member 13 is tightened to the tightening section 113 of the pivot shaft 11. The elastic force provided by the at least one external tooth washer 14 may therefore be used to control the tightness by which the bracket 12 is pivotally connected to the pivot shaft 11. When the fastening member 13 is screwed onto the tightening section 113 toward the shaft section 112, the at least one external tooth washer 14 is subject to a compressive force and the external teeth 141 of the external tooth washer 14 are pushed against other elements on the shaft section 112 to bring the same to tightly bear against one another, resulting in an increased frictional force between these elements and, accordingly, an increased pivoting resistance between the bracket 12 and the pivot shaft 11. On the other hand, when the fastening member 13 is turned away from the shaft section 112, the external teeth 141 of the at least one external tooth washer 14 are released from the compressive force to result in a decreased pivoting resistance between the bracket 12 and the pivot shaft 11.

The mounting section 111 of the pivot shaft 11 is provided with at least one mounting holes 1111, via which the pivot shaft 11 is mounted to the first part of the clam-type electronic apparatus, such as the mainframe of the notebook computer.

The tightening section 113 is provided on an outer surface with screw threads, and the fastening member 13 may be a nut corresponding to the screw threads on the tightening section 113, so that the fastening member 13 may be screwed to the tightening section 113.

The mounting arm 121 of the bracket 12 is provided with at least one mounting hole 1211, via which the bracket 12 is mounted to the second part of the clam-type electronic apparatus, such as the screen of the notebook computer.

Figure 3:
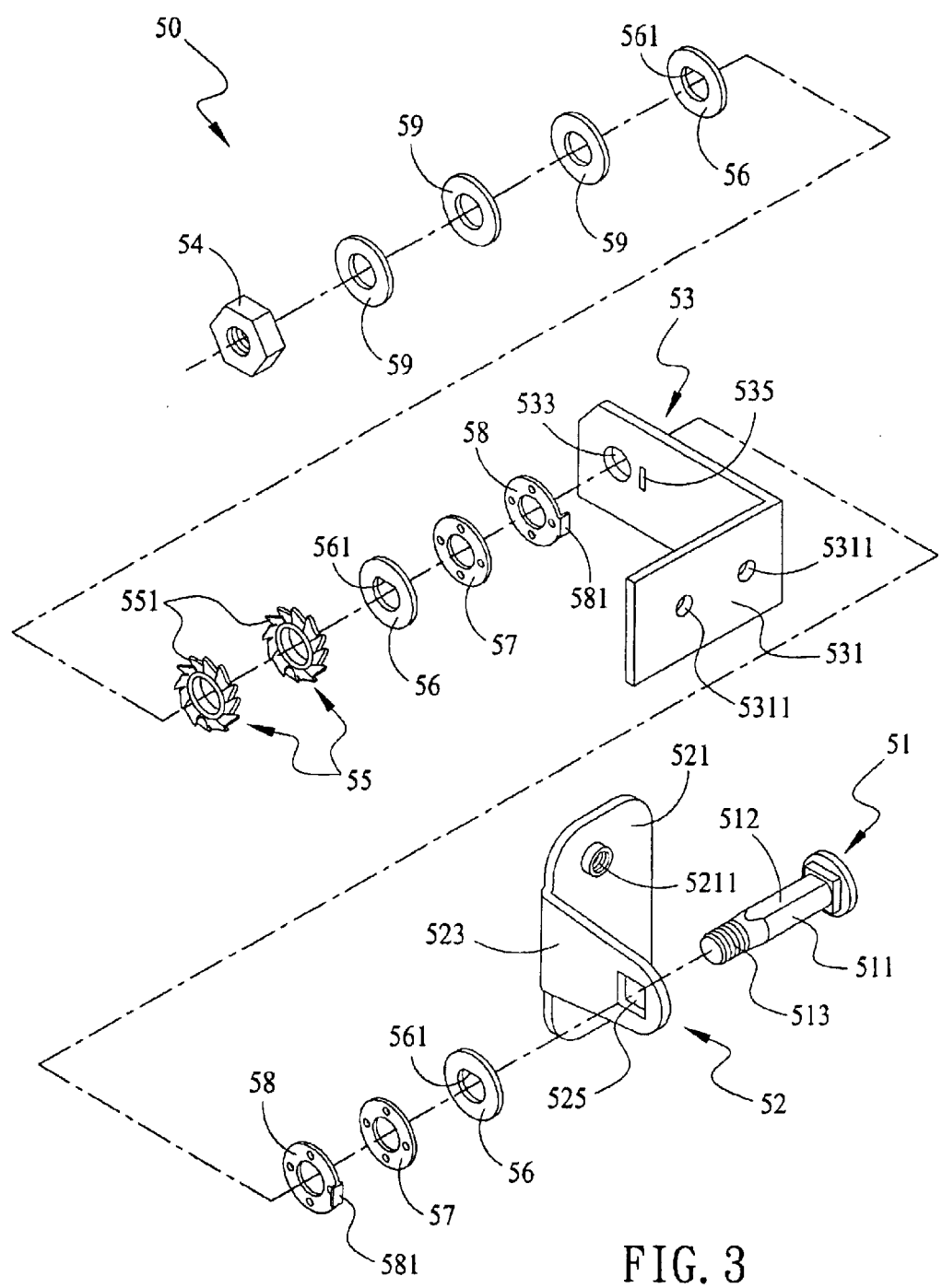
FIG. 3 is an exploded perspective view of a hinge structure according to a second embodiment of the present invention.
Figure 4:
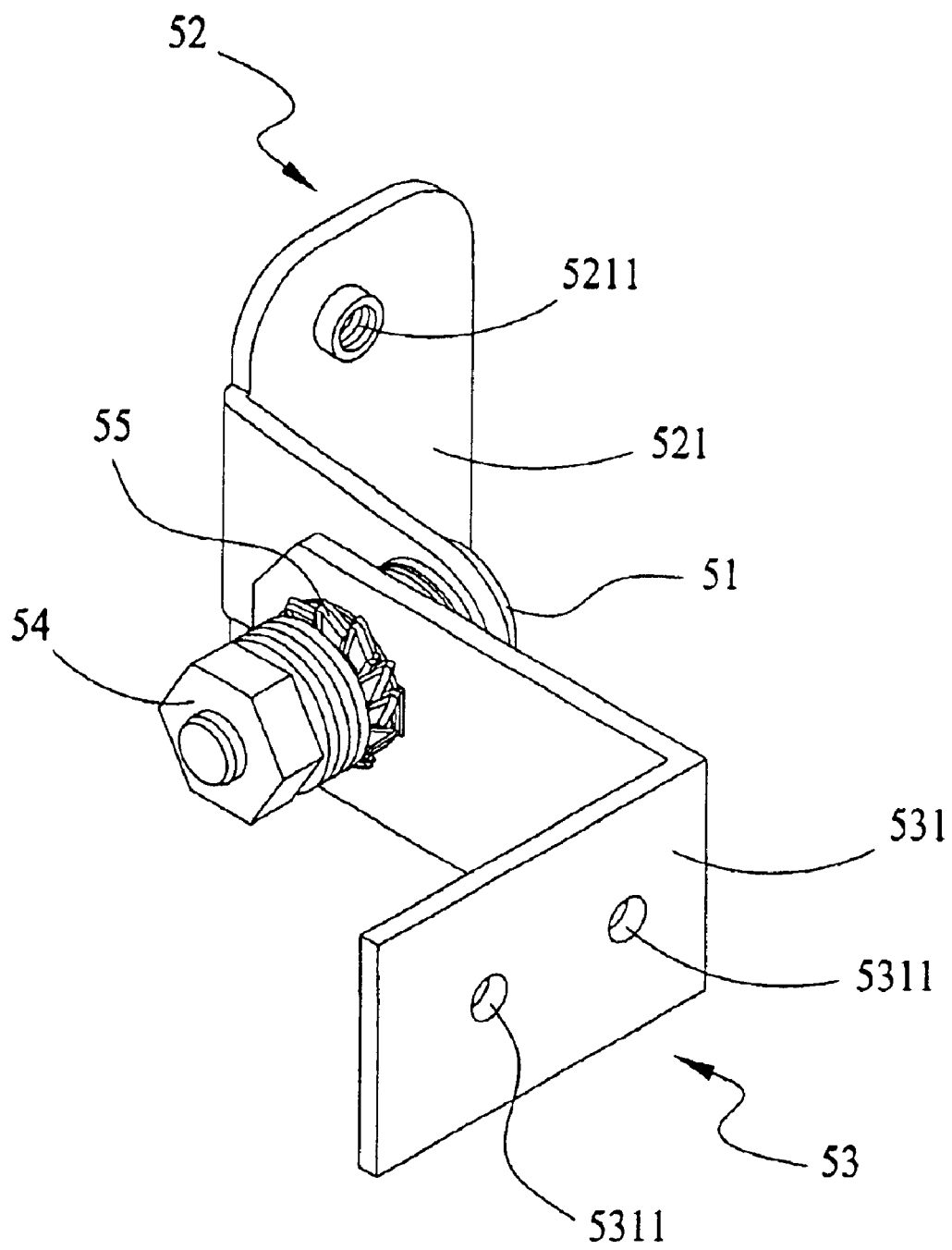
FIG. 4 is an assembled perspective view of FIG. 3.

Please refer to FIGS. 3 and 4 that are exploded and assembled perspective views, respectively, of a hinge structure 50 according to a second embodiment of the present invention. In the second embodiment, the hinge structure 50 mainly includes a pivot shaft 51, a first bracket 52, a second bracket 53, a fastening member 54, and at least one external tooth washer 55 located between the second bracket 53 and the fastening member 54.

The pivot shaft 51 includes a shaft section 511, on one side of which there is provided a flat surface to serve as a swing-stop section 512. A tightening section 513 is provided at an outer end of the shaft section 511. The first bracket 52 is an L-shaped member including a mounting arm 521 for fixedly mounting to the first part of the clam-type apparatus, such as the mainframe of the notebook computer (not shown), and a locating arm 523 perpendicular to the mounting arm 521. The locating arm 523 is provided near a free end with a swing-stop hole 525 for engaging with the swing-stop section 512 of the shaft section 511, so that the first bracket 52 is prevented from turning relative to the pivot shaft 51.

The second bracket 53 is also an L-shaped member including a mounting arm 531 for mounting to the second part of the clam-type apparatus, such as the screen of the notebook computer (not shown), and a second arm perpendicular to the mounting arm 531. The second arm is provided at a predetermined position with a shaft hole 533 for the shaft section 511 of the pivot shaft 51 to rotatably mount therein. The at least one external tooth washer 55 is provided along an outer circumference with a plurality of radially outward projected external teeth 551. After the first and the second bracket 52, 53, and the at least one external tooth washer 55 are sequentially mounted on the pivot shaft 51 and the fastening member 54 is screwed to the tightening section 513 at the outer end of the shaft section 511 of the pivot shaft 51, the hinge structure 50 is primarily formed.

When the mounting arm 521 of the first bracket 52 and the mounting arm 531 of the second bracket 53 are respectively connected to the two parts of the clam-type electronic apparatus, such as the mainframe and the screen of the notebook, the external teeth 551 of the at least one external tooth washer 55 would be firmly and elastically pressed by the fastening member 54 against the second bracket 53. In this manner, turning of the screen would not bring the fastening member 54 to turn at the same time, and the fastening member 54 is therefore prevented from separating from the pivot shaft 51 after the screen has been pivotally turned many times.

In the second embodiment shown in FIGS. 3 and 4, there are still a locating ring 56, an oil ring 57, and a lugged ring 58 provided between the first and the second bracket 52, 53. Moreover, a lugged ring 58, an oil ring 57, and a locating ring 56 are also provided between the second bracket 53 and the at least one external tooth washer 55. Each of the lugged rings 58 is provided on a circumference thereof with a lug 581 that is axially extended toward one side to be perpendicular to the ring 58. And, the second bracket 53 is formed on the second arm to an inner side of the shaft hole 533 with a receiving hole 535 corresponding to the lug 581 on the lugged ring 58. The two lugged rings 58 are separately located at two opposite sides of the shaft hole 533 on the second arm of the second bracket 53 with the lugs 581 extended into the receiving hole 535 from two opposite sides thereof.

In the embodiment shown in FIGS. 3 and 4, there are still a locating ring 56 and at least one flat washer 59 located between the at least one external tooth washer 55 and the fastening member 54. The locating rings 56 are provided at an inner circumference with a straight section 561 corresponding to the flat surface of the swing-stop section 512 on the pivot shaft 51. With the straight section 561 engaged with the flat surface of the swing-stop section 512, the locating ring 56 is fixedly-located on the shaft section 511.

The external teeth 551 on the at least one external tooth washer 55 are provided with a certain degree of elasticity, so that the external tooth washer 55 may bear a relatively large compressive force, and applies an axial elastic compression to other elements that are put on the shaft section 511 of the pivot shaft 51, causing these elements to elastically and tightly bear against one another. The elastic force applied by the external tooth washer 55 to other elements may be regulated via an extent by which the fastening member 54 is tightened to the tightening section 513 of the pivot shaft 51. The elastic force provided by the at least one external tooth washer 55 may therefore be used to control the tightness by which the second bracket 53 and the first bracket 52 are pivotally connected to the pivot shaft 51. When the fastening member 54 is screwed onto the tightening section 513 toward the shaft section 511, the at least one external tooth washer 55 is subject to a compressive force and the external teeth 551 of the external tooth washer 55 are pushed against other elements on the shaft section 511 to bring the same to tightly bear against one another, resulting in an increased frictional force between these elements and, accordingly, an increased pivoting resistance between the second and the first bracket 53, 52 and the pivot shaft 51. On the other hand, when the fastening member 54 is turned away from the shaft section 511, the external teeth 551 of the at least one external tooth washer 55 are released from the compressive force to result in a decreased pivoting resistance between the brackets 52, 53 and the pivot shaft 51.

The mounting arm 521 of the first bracket 52 is provided with at least one mounting holes 5211, such as an internally threaded hole, via which the first bracket 52 is mounted to the first part of the clam-type electronic apparatus, such as the mainframe of the notebook computer.

The tightening section 513 is provided on an outer surface with screw threads, and the fastening member 54 may be a nut corresponding to the screw threads on the tightening section 54, so that the fastening member 54 may be screwed to the tightening section 513.

The mounting arm 531 of the second bracket 53 is provided with at least one mounting hole 5311, via which the second bracket 53 is mounted to the second part of the clam-type electronic apparatus, such as the screen of the notebook computer.

Figure 5:
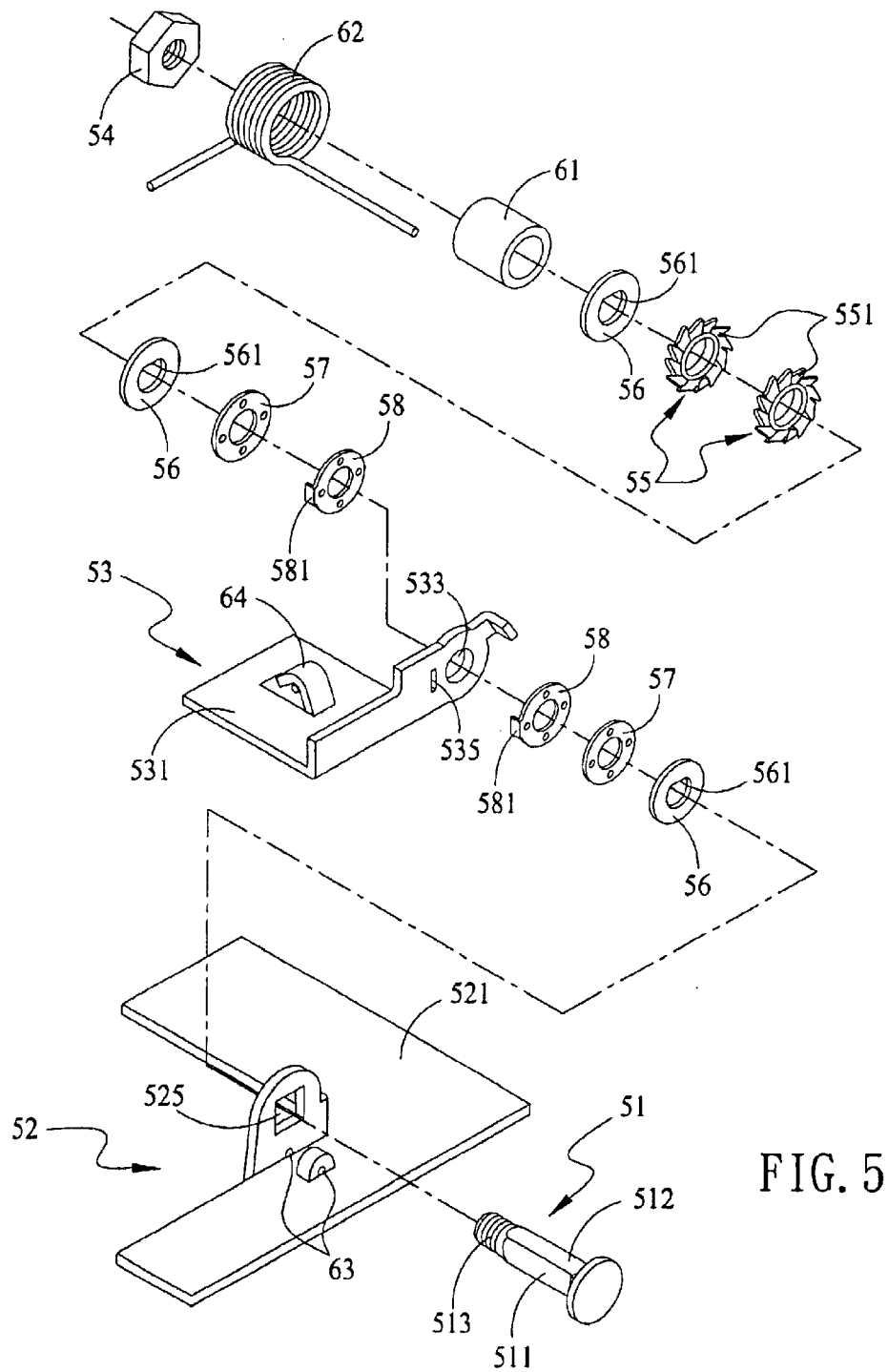
FIG. 5 is an exploded perspective view of a hinge structure according to a third embodiment of the present invention.
Figure 6:
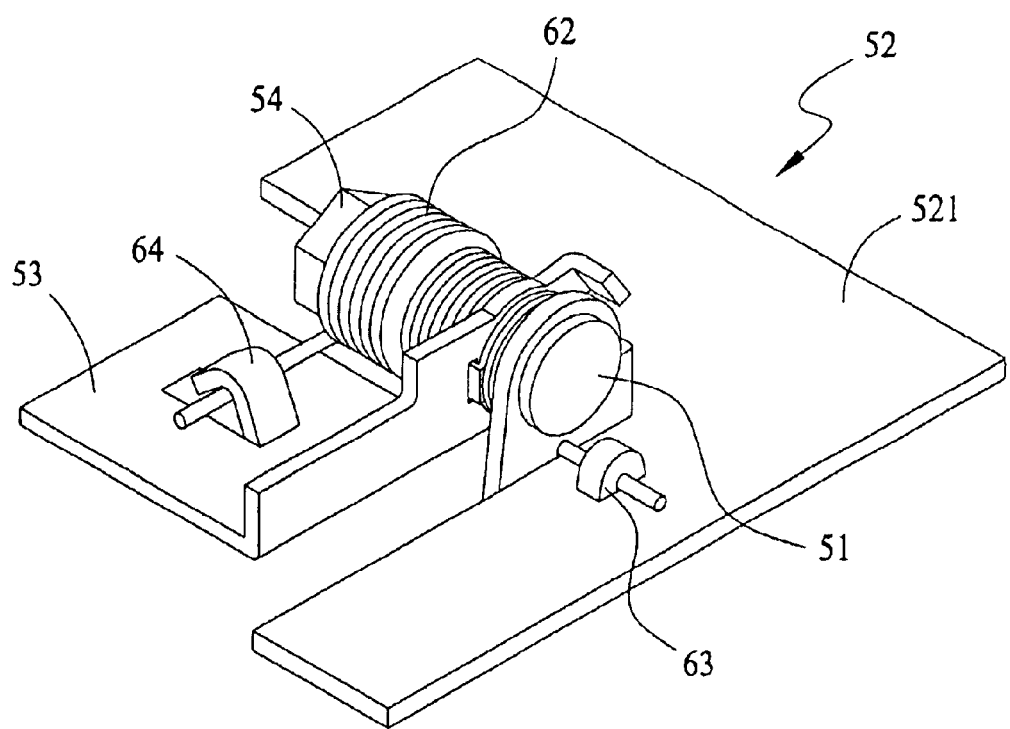
FIG. 6 is an assembled perspective view of FIG. 5.

FIGS. 5 and 6 are exploded and assembled perspective views, respectively, of a hinge structure 50 according to a third embodiment of the present invention. The hinge structure 50 of the third embodiment is generally structurally similar to the second embodiment with some modifications made to the first and the second bracket 52, 53. The hinge structure 50 of the third embodiment includes a pivot shaft 51 similar to that in the second embodiment and having a shaft section 511, a swing-stop section 512, and a tightening section 513; a first bracket 52 having a flat L-shaped mounting section 521 for mounting to the first part of the clam-type apparatus, such as a mainframe of a notebook computer (not shown) and an upright lug provided near a center of the L-shaped mounting section 521; an L-shaped second bracket 53 having a mounting arm 531 for mounting to the second part of the clam-type apparatus, such as the screen of the notebook computer (not shown), and a second arm perpendicular to the mounting arm 531; a fastening member 54; and at least one external tooth washer 55 located between the fastening member 54 and the second bracket 53. A locating ring 56 and a sleeve 61 are provided between the fastening member 54 and the at least one external tooth washer 55, and a torsional spring 62 is provided between the sleeve 61 and the fastening member 54. The upright lug near the center of the mounting section 521 of the first bracket 52 is provided with a swing-stop hole 525 for engaging with the swing-stop section 512 of the shaft section 511 of the pivot shaft 51. Two through holes 63 are separately provided at a lower edge of the upright lug below the swing-stop hole 525, and on a top of the mounting section 521 in front of the upright lug. The torsional spring 62 is mounted on the shaft section 511 with one leg thereof extended through the two through holes 63.

The mounting arm 531 of the second bracket 53 is provided at a predetermined position with a retaining tongue 64 for holding another leg of the torsional spring 62 thereto. With two legs separately held in the through holes 63 on the first bracket 52 and the retaining tongue 64 on the second bracket 53, the torsional spring 62 provides an increased elastic force for the hinge structure 50 when the screen is pivotally turned upward.

Figure 7:
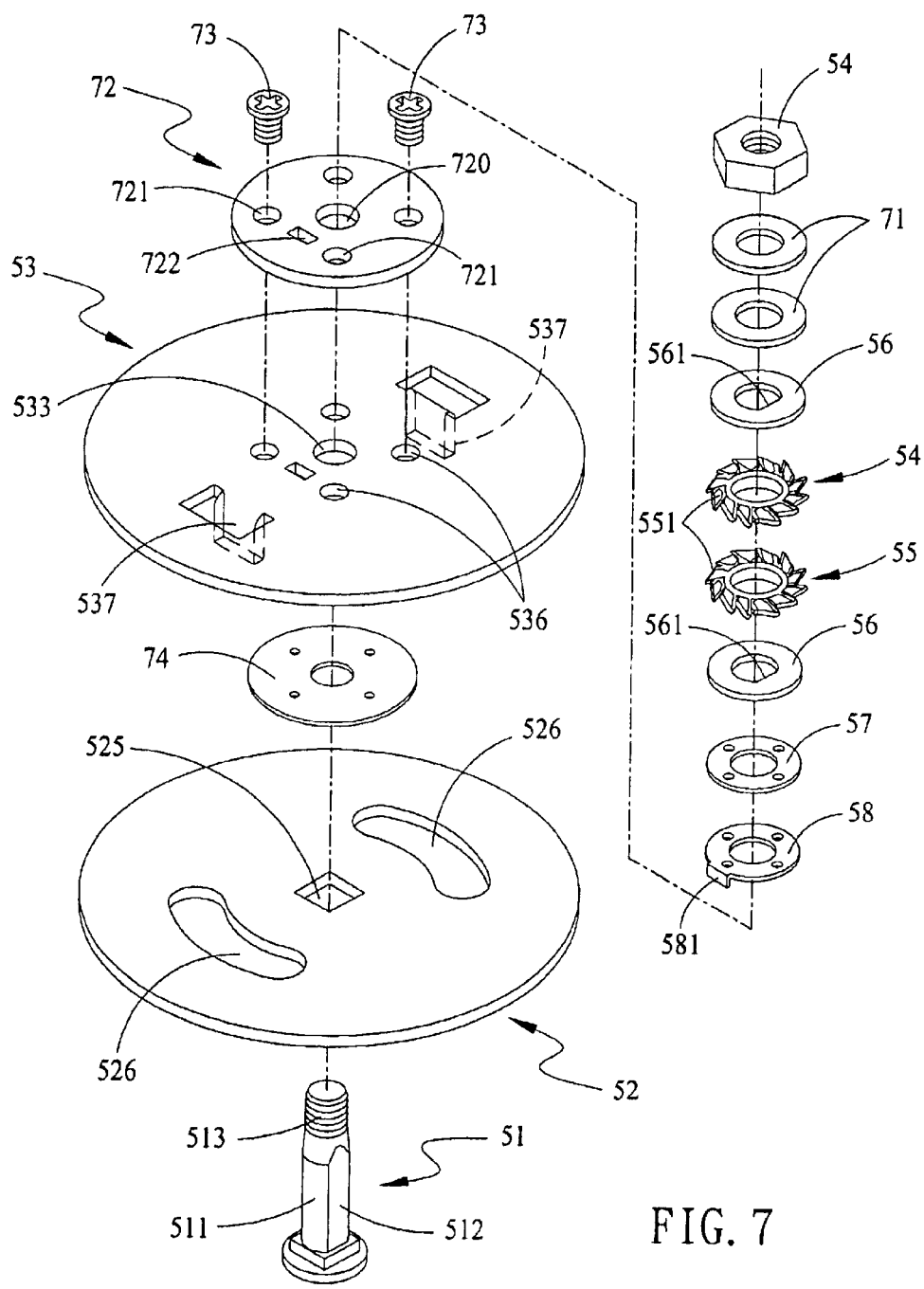
FIG. 7 is an exploded perspective view of a hinge structure according to a fourth embodiment of the present invention.
Figure 8:
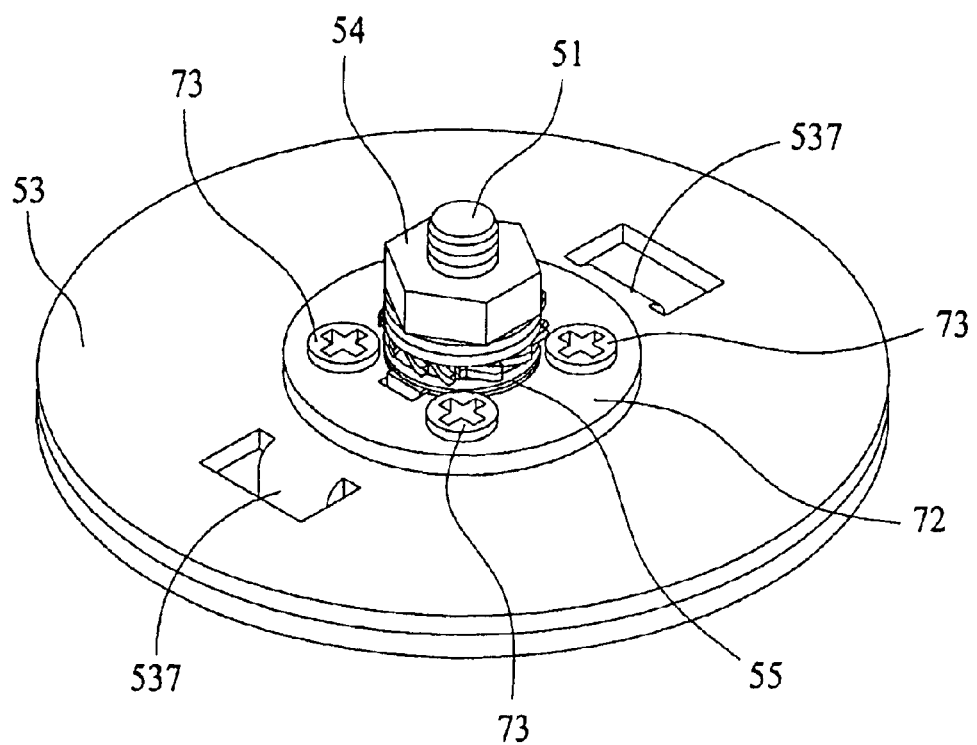
FIG. 8 is an assembled perspective view of FIG. 7.

Please refer to FIGS. 7 and 8 that are exploded and assembled perspective views, respectively, of a hinge structure 50 according to a fourth embodiment of the present invention. The hinge structure 50 of the fourth embodiment is structurally similar to the second and the third embodiment with some changes made to the first and the second bracket. The hinge structure 50 of the fourth embodiment includes a pivot shaft 51 similar to that in the second and the third embodiment and having a shaft section 511, a swing-stop section 512, and a tightening section 513; a first circular mounting plate 52 having a centered swing-stop hole 525 and two long curved slots 526 formed at two opposite sides of the swing-stop hole 525; a second circular mounting plate 53 having a centered shaft hole 533, a plurality of screw holes 536 surrounding the shaft hole 533, and two opposite hooks 537 formed at an inner side of the second circular bracket 53 corresponding to the two opposite long curved slots 526 on the first circular mounting plate 52; a fastening member 54; and at least one external tooth washer 55.

A locating ring 56 and at least one washer 71 are provided between the external tooth washer 55 and the fastening member 54, and a circular hold-down plate 72 is located between the second circular mounting plate 53 and a lugged ring 58, which is located between the at least one external tooth washer 55 and the second circular mounting plate 53. The circular hold-down plate 72 is provided with a central hole 720, a plurality of fixing holes 721 surrounding the central hole 720 to correspond to the screw holes 536 on the second circular mounting plate 53 in position and in quantity, and a receiving hole 722 adapted to engage with a lug 581 on the lugged ring 58. Screws 73 are extended through the fixing holes 721 on the hold-down plate 72 into the screw holes 536 on the second circular mounting plate 53 to connect the hold-down plate 72 to the second circular mounting plate 53.

An oil ring 74 is located between the second and the first circular mounting plate 53, 52. The second and the first circular mounting plate 53, 52 are connected to each other by extending the hooks 537 of the second circular mounting plate 53 through the long curved slots 526 of the first circular mounting plate 52.

After the first and the second circular mounting plate 52, 53, and the at least one external tooth washer 55 are sequentially mounted on the pivot shaft 51 and the fastening member 54 is screwed to the tightening section 513 at the outer end of the shaft section 511 of the pivot shaft 51, the hinge structure 50 according to the fourth embodiment of the present invention is primarily formed.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A hinge structure, comprising:

a pivot shaft including a shaft section, said shaft section being provided at one side with a flat surface to serve as a swing-stop section and at an end with a tightening section;

a first bracket including a mounting arm for fixedly mounting to a mainframe of a clam-type apparatus, and a locating arm perpendicular to said mounting arm; said locating arm being provided near a free end with a swing-stop hole for engaging with said swing-stop section of said shaft section of said pivot shaft, so that said first bracket is prevented from turning relative to said pivot shaft;

a second bracket including a mounting arm for mounting to a screen of said claim-type apparatus, and a second arm perpendicular to said mounting arm; said second arm being provided at a predetermined position with a shaft hole for said shaft section of said pivot shaft to rotatably mount therein;

a fastening member; and at least one external tooth washer located between said second bracket and said fastening member, each of the at least one external tooth washer having a plurality of radially outwardly projected external teeth located on an outer circumference thereof;

said first and said second bracket and said at least one external tooth washer being sequentially mounted on said pivot shaft and said fastening member being screwed to said tightening section of said pivot shaft to form said hinge structure;

whereby when said mounting arm of said first bracket and said mounting arm of said second bracket are connected to said mainframe and said screen, respectively, of said claim-type electronic apparatus, said external teeth of said at least one external tooth washer are pressed between said second bracket and said fastening member mounted on said pivot shaft, and thereby preventing said fastening member from turning along with said screen when said screen is pivotally turned, or separating from said pivot shaft after said screen has been pivotally turned many times, further comprising a locating ring and a sleeve provided between said fastening member and said at least one external tooth washer, and a torsional spring provided between said sleeve and said fastening member; and wherein said first bracket is provided near a center thereof with a swing-stop hole for engaging with said swing-stop section of said shaft section of said pivot shaft; through holes being provided on said first bracket below said swing-stop hole; and wherein said mounting arm of said second bracket is provided at a predetermined position with a retaining tongue; said torsional spring including two legs and being mounted on said pivot shaft with one of said two legs extended through said through holes on said first bracket, and the other one of said two legs held to said second bracket by said retaining tongue on said mounting arm of said second bracket, such that said torsional spring provides an increased elastic force for said hinge structure when said screen is pivotally turned upward.

2. The hinge structure as claimed in claim 1, wherein said tightening section on said pivot shaft is provided on an outer surface with screw threads, and said fastening member comprises a nut corresponding to said screw threads for said fastening member to screw to said tightening section.

* * * * *